United States Patent

Stewart et al.

[11] Patent Number: 5,913,564
[45] Date of Patent: Jun. 22, 1999

[54] SIDE PANEL FOR POP-UP CAMPERS

[75] Inventors: Stacy Stewart, Goshen; Margo Kauffman, Middlebury; Lori West, Elkhart, all of Ind.

[73] Assignee: Jayco, Inc., Middlebury, Ind.

[21] Appl. No.: 08/874,429

[22] Filed: Jun. 13, 1997

[51] Int. Cl.$^6$ .................................................. B60P 3/39
[52] U.S. Cl. ........................ 296/172; 296/141; 296/168; 160/120; 160/243
[58] Field of Search .................................. 296/172, 165, 296/173, 176, 138, 140, 141, 145; 160/120, 122, 241, 243; 135/88.13, 88.1, 88.11, 88.12, 87

[56] References Cited

U.S. PATENT DOCUMENTS

| | | | |
|---|---|---|---|
| 75,037 | 3/1868 | Matchell | 160/241 |
| 198,573 | 12/1877 | Copeland | 296/141 |
| 227,262 | 5/1880 | Kendall | 296/138 |
| 519,437 | 5/1894 | Smiley | 160/120 |
| 1,091,656 | 3/1914 | Harnly | 160/243 |
| 1,180,762 | 4/1916 | Coppedge | 160/243 |
| 1,181,120 | 5/1916 | Douthitt | 160/243 |
| 1,225,060 | 5/1917 | Russell | 160/243 |
| 1,255,953 | 2/1918 | Turk | 160/122 |
| 1,482,458 | 2/1924 | Brunsman | 296/138 |
| 1,615,931 | 2/1927 | Cann | 160/243 |
| 1,847,077 | 3/1932 | Boeck | 160/243 |
| 2,002,596 | 5/1935 | Westrope | 296/145 |
| 2,056,154 | 10/1936 | Benson | 160/243 |
| 2,336,899 | 12/1943 | Stern | 160/243 |
| 2,582,276 | 1/1952 | Powers | 160/243 |
| 2,631,661 | 3/1953 | Nelson | 160/243 |
| 5,417,469 | 5/1995 | Hammond | 296/165 |
| 5,676,414 | 10/1997 | Hammond | 296/165 |
| 5,788,317 | 8/1998 | Nation | 296/141 |

*Primary Examiner*—Joseph D. Pape
*Assistant Examiner*—Kiran Patel
*Attorney, Agent, or Firm*—Baker & Daniels

[57] ABSTRACT

A flexible window assembly for covering a window in a flexible wall such as is commonly found on recreational vehicles such as tent campers. The assembly includes a flexible transparent window pane that covers the screened opening in the flexible sidewall. The window pane is attached to the sidewall by a zipper and by rolling the window pane into a cylindrical shape the window pane is opened. A pair of flexible retaining straps extend between the top edge and the bottom edge of the wall which maintain the window pane in the cylindrical position. Each retaining strap includes a pair of cords, and a flexible decorative curtain is positioned in between the cords. A toggle member frictionally engages the cords and contacts the lower edge of the curtain, and accordingly the curtain can be positioned on a closed position, a raised position, or in a plurality of intermediate positions between the closed position and the raised position.

11 Claims, 6 Drawing Sheets

SIDE PANEL FOR POP-UP CAMPERS

The present invention relates to an improved flexible sidewall for pop-up campers that provides a flexible roll-down window, a decorative interior curtain, and a single retaining/adjusting mechanism for operating the window and the curtain.

BACKGROUND AND SUMMARY OF THE INVENTION

Towable tent campers and pop-up trailers having collapsible roofs are generally well known in the art. Despite the wide spread popularity of large recreational vehicles such as motorhomes and fifth wheel trailers, many consumers prefer the relative simplicity, low cost and ease of operation of the smaller and less expensive towable pop-up trailers and tent campers. On a pop-up camper, the top folds down to a collapsed, compact state giving the trailer a low aerodynamic profile and making the trailer easily towable by small cars and light trucks. Once the desired destination has been reached, the collapsible top is raised relative to the body to form a temporary living space which is typically enclosed by flexible, tent like walls.

Tent campers typically have flexible canvas sidewalls which extend between the camper body and the collapsible top. In order to brighten the interior of the tent camper, many tent campers include one or more flexible transparent windows. The flexible windows are usually attached to the sidewalls by zippers. In order to provide increased ventilation, the zippers can be unzipped to expose a screened opening. In order to open the window, the window unzips from the flexible sidewall and is rolled downwardly into a cylindrical shape. In order to protect the window from damage, a pair of vertical retaining straps are provided to maintain the window in the rolled position against the camper sidewall.

Tent campers may also be equipped with decorative curtains similar to those found in larger recreational vehicles and homes. The curtains lend a more finished, pleasing appearance to the interior of the camper and are thus very desirable. Unfortunately, the curtains generally require operating hardware separate from and in addition to the retaining straps required by the windows, which results in a very cluttered interior. Accordingly, it is desirable to have a single mechanism that controls both the flexible window and the decorative curtain.

The improved wall panel of the present invention provides a retaining mechanism that not only retains the window in the rolled position but also serves as an adjustment mechanism to control the position of the window curtain. The combined mechanism thus eliminates hardware. The mechanism also provides for quickly and easily adjusting the position of the decorative curtain, and allows the curtain to placed in a wide variety of positions.

Accordingly, it is an object of this invention to provide an improved interior wall panel assembly for pop-up campers.

It is another object of this invention to provide an improved wall panel assembly for pop-up campers that uses the same mechanism for both retaining the window in the rolled open position and for adjusting the curtain.

Other objects of the invention will become readily apparent to those skilled in the art upon a reading of the following description.

DETAILED DESCRIPTION OF THE INVENTION

Figure 1:
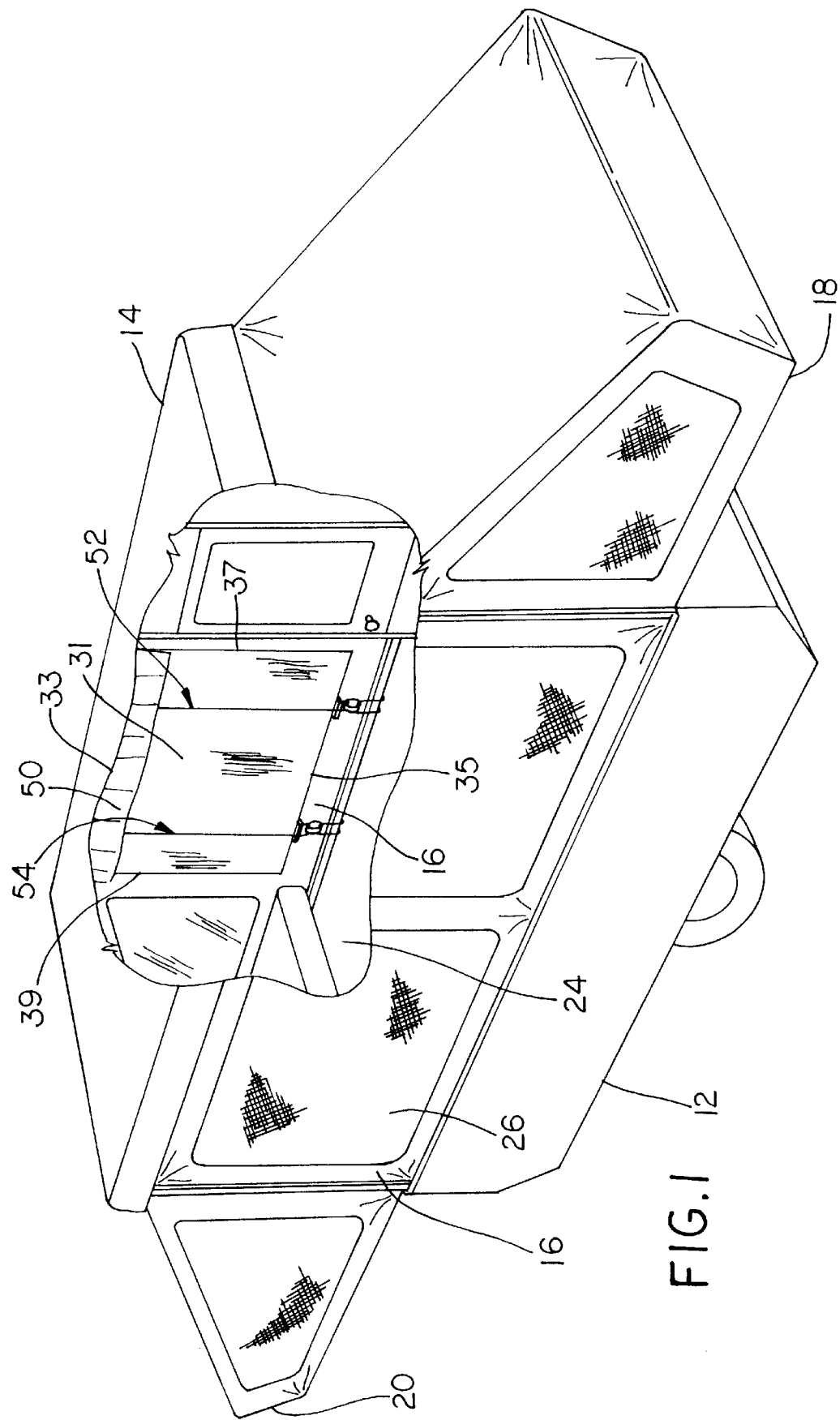
FIG. 1 is a fragmentary view in perspective of the interior of a tent camper showing the prior art retention straps for holding the rolled-down window in position against the camper sidewall.
Figure 2:
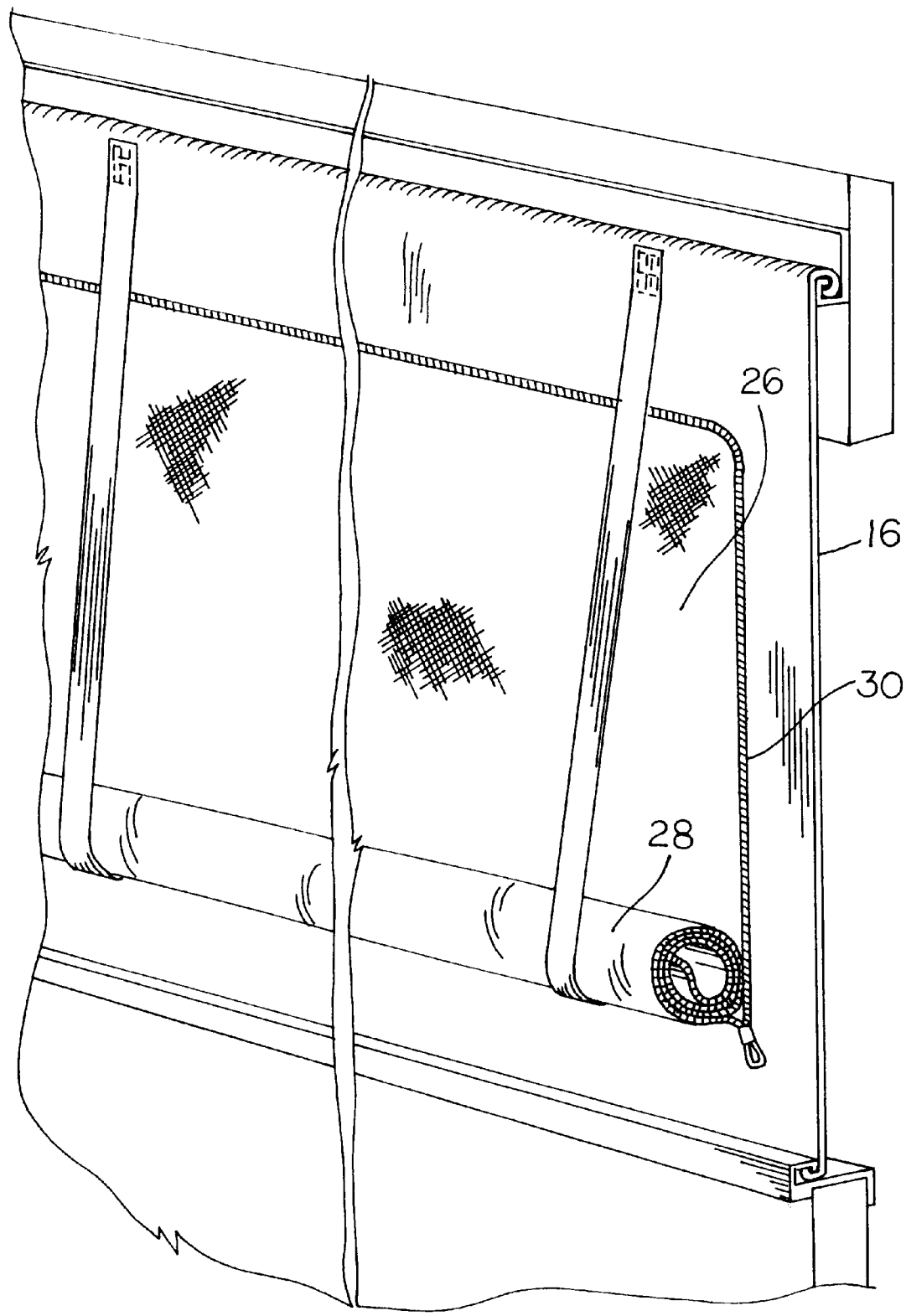
FIG. 2 is a perspective view of a portion of a tent camper wall illustrating a window according to the prior art.

The embodiment herein described is not intended to be exhaustive or to limit the invention to the precise form disclosed. It has been chosen and described in order to explain the principles of the invention and its application and practical use to enable others skilled in the art to follow its teachings.

Referring now to the drawings, a pop-up tent camper 10 includes an improved flexible sidewall 16 incorporating the teachings of the present invention. Camper 10 includes a lower or body portion 12 and a top portion 14 that is raisable relative to the body portion 12 using conventional telescoping support posts or similar means (not shown) as are commonly employed in the industry. Camper 10 typically includes a front and rear fold-out section 18, 20 respectively. Flexible sidewalls 16 surround the camper 10 to define and enclose an interior space 24. Each of the sidewalls 16 typically include a screened opening 26, typically covered with mosquito netting, as is common in the industry.

Figure 3:
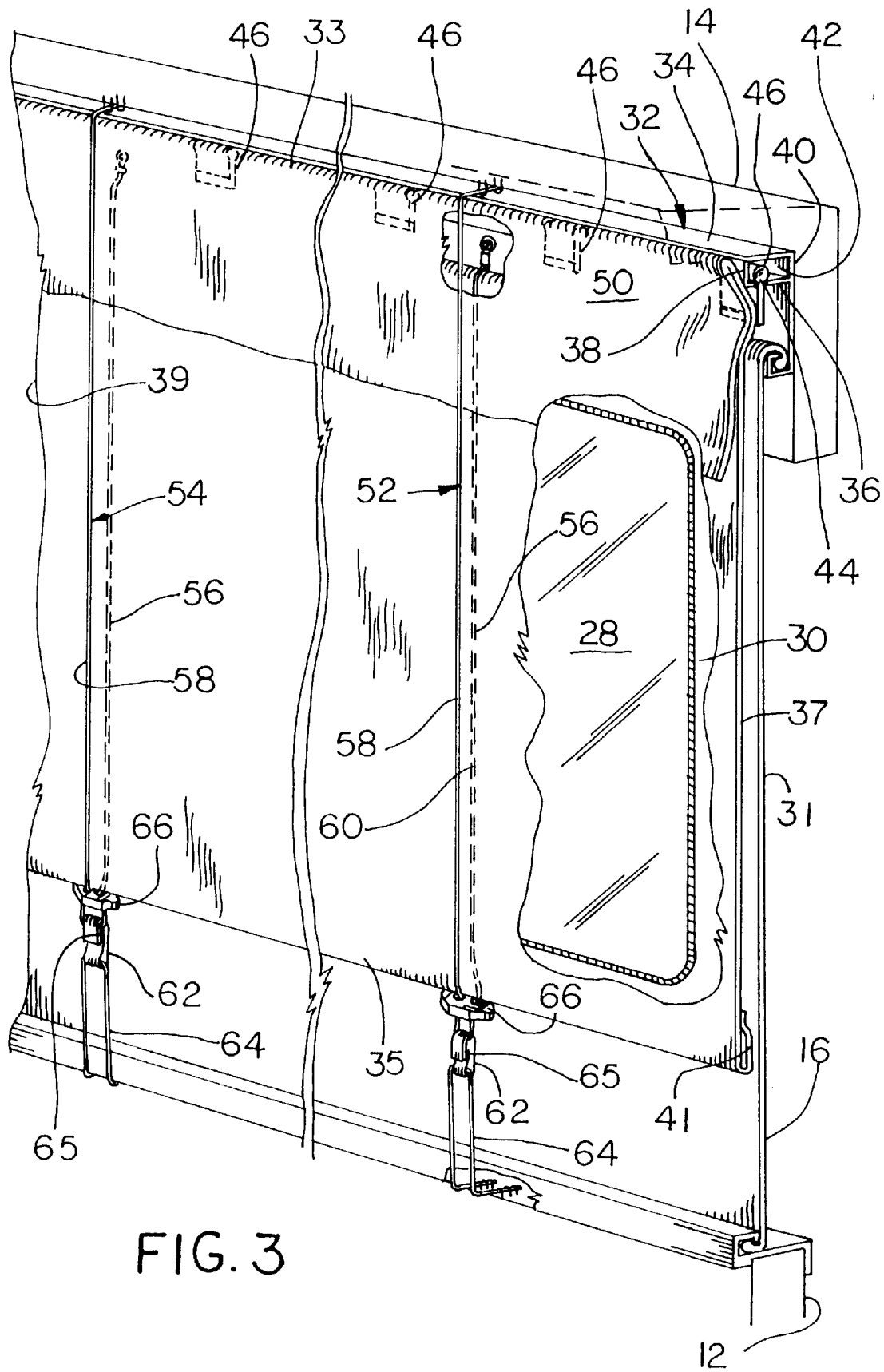
FIG. 3 is a fragmentary view in perspective of a camper sidewall, similar to that shown in FIG. 2, but incorporating the features of the present invention; a portion of the curtain has been cut away to reveal the flexible window.
Figure 4:
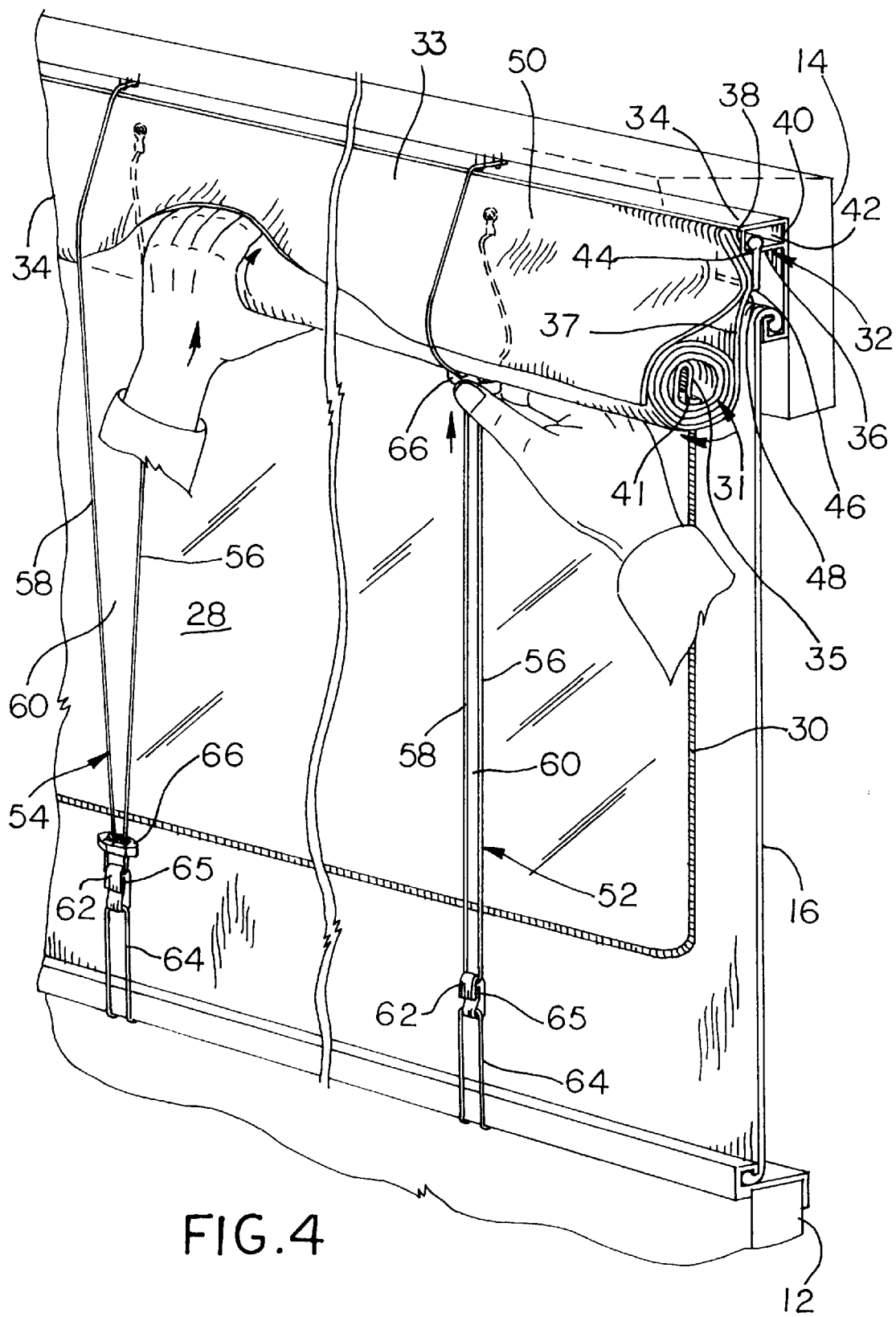
FIG. 4 is a perspective view similar to that shown in FIG. 3 but showing the curtain in the open position.
Figure 5:
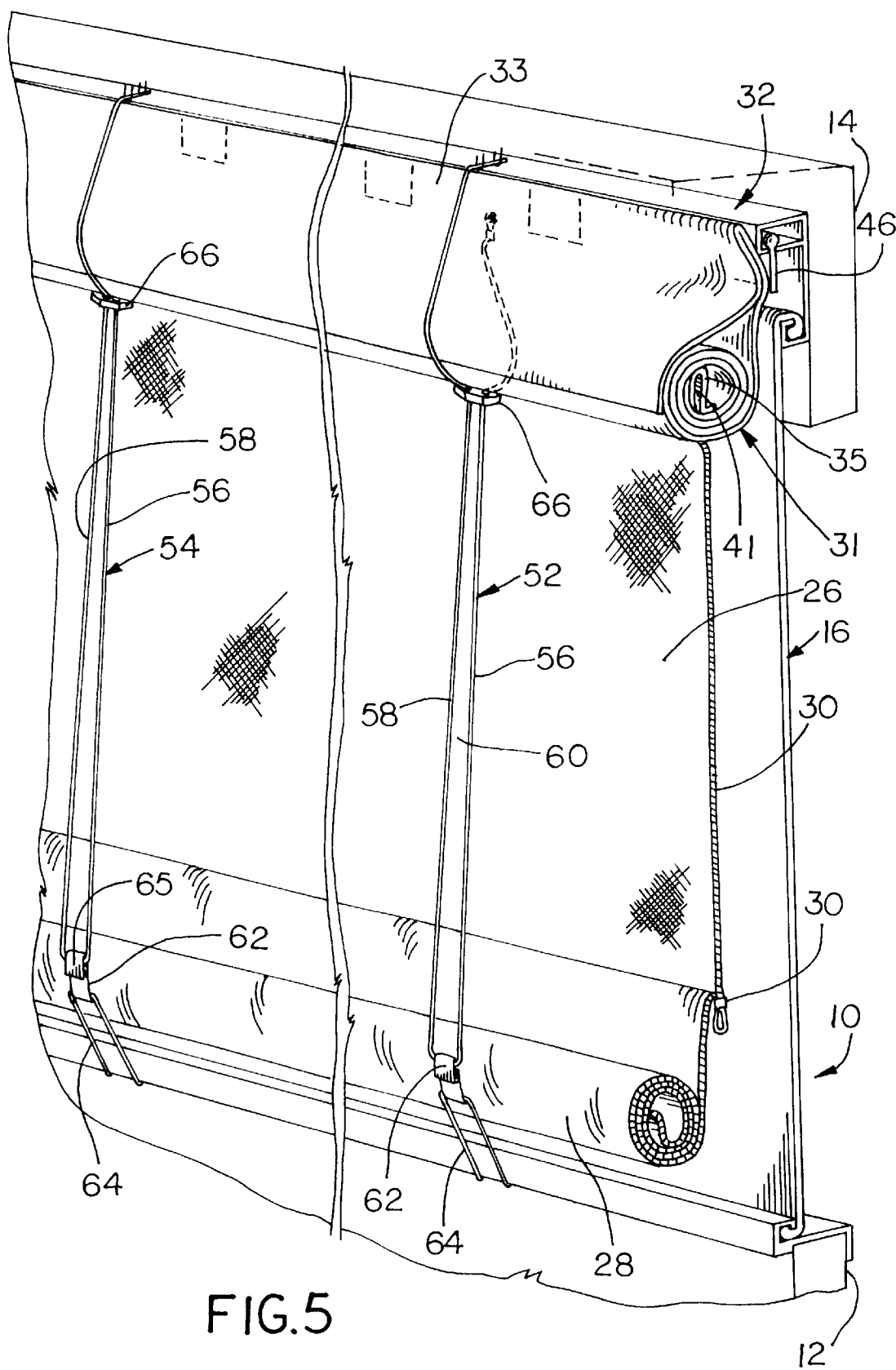
FIG. 5 is a perspective view similar that shown in FIGS. 3 and 4 but showing the flexible window rolled down into the open position exposing the screened opening in the camper sidewall.

As shown in FIGS. 3, 4 and 5, each sidewall 16 includes a flexible transparent window 28 which is attached to sidewall 16 by a zipper 30. Window 28 is constructed of a clear flexible material as is commonly employed in the camper industry. Window 28 can be rolled into the configuration shown in FIG. 5. Accordingly, window 28 is shiftable between the closed position shown in FIG. 3 in which the window 28 covers the screened opening 26 in sidewall 16, and the open position as shown in FIG. 5 in which the flexible window 28 has been rolled down to reveal the screened opening 26.

A flexible curtain 31 is mounted on a mounting bracket 32, which is attached to the top portion 14 of camper 10 by conventional fasteners (not shown). Curtain 31 includes an upper edge 33, a lower edge 35, and a pair of side edges 37, 39. Lower edge 35 is preferably provided with a rigid elongated member 41. Bracket 32 includes a top face 34, a bottom face 36, and a pair of interconnecting side faces 38, 40. Faces 32, 34, 36 and 40 surround an internal cavity 42, and bottom face 36 includes an elongated slot or channel 44 for receiving a plurality of mounting tabs 46 carried by the top edge 48 of curtain 31. Accordingly, tabs 44 and curtain 31 can slide along channel 44 enabling curtain 31 to slide laterally relative to bracket 32 for adjustment and/or removal. Flexible curtain 31 preferably includes a decorative valance panel 50. A pair of vertical retaining straps 52, 54 serve to hold window 28 against sidewall 16, and also provide for the adjustment of curtain 31 as is discussed in greater detail below.

Figure 6:
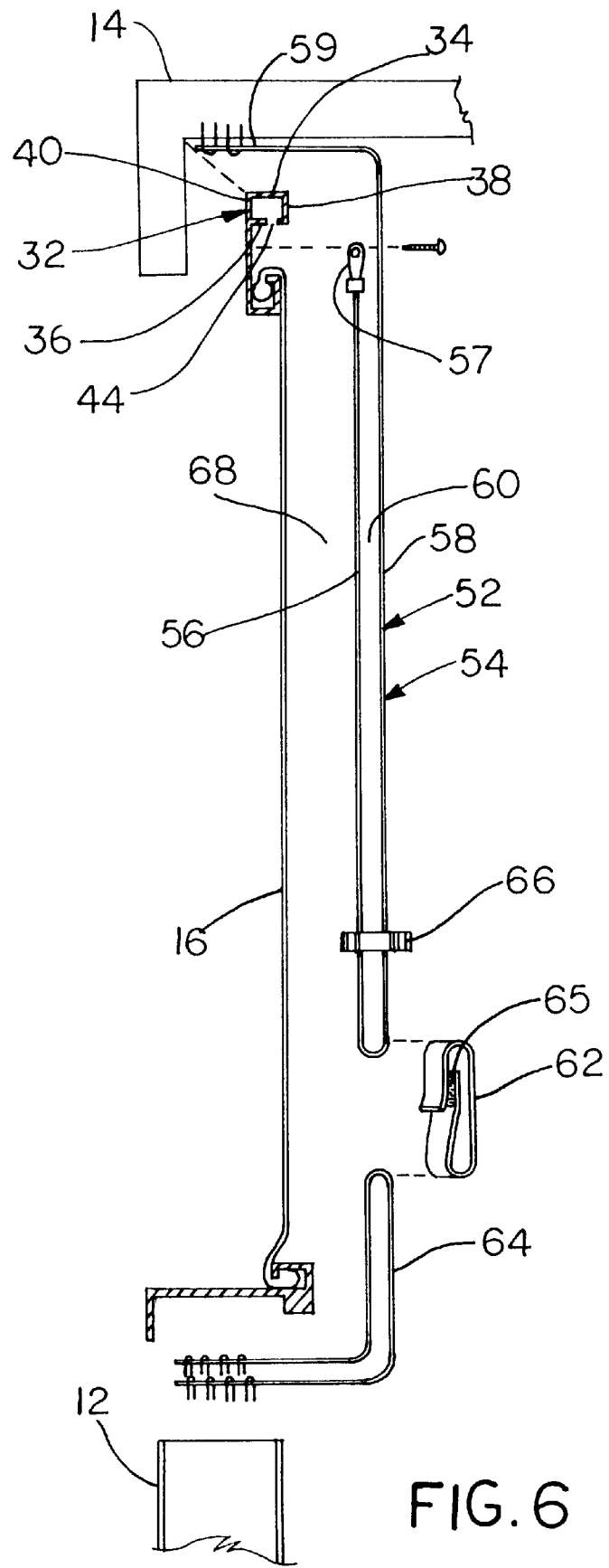
FIG. 6 is a fragmentary view taken substantially along lines 6—6 of FIG. 5 showing the retaining/adjusting mechanism of the present invention; the curtain has been removed for clarity.

As shown in FIG. 6, each retaining strap 52, 54 includes an inner cord 56 and an outer cord 58 defining a gap 60 therebetween. The upper end 57 of cord 56 is attached to bracket 32, while the upper end 59 of cord 58 is attached to top portion 14. A removable loop 62 attached to a strap 64 secures the lower ends of cords 56, 58 to body portion 12. Strap 64 is preferably a stretchable cord which provides resilience to straps 52, 54. Loop 62 preferably includes a Velcro hook and loop fastening strips 65 or similar hook and loop fasteners. A toggle member 66 is attached to and frictionally engages cords 56 and 58, so that toggle member 66 can slide up and down along cords 56, 58. A gap 68 is defined between straps 52, 54 and sidewall 16.

As shown in FIG. 5, window 28 is disposed within the gap 68 between straps 52, 54 and sidewall 16, so that when window 28 is in the open position the retaining straps 52, 54 maintain the window 28 in the rolled position up against sidewall 16. Similarly, as shown in FIGS. 3 and 4, curtain 30 is disposed within the gap 60 between cords 56 and 58. As such, the lower edge 35 of curtain 31 contacts one or both of the toggle members 66, enabling the position of the curtain to be controlled by moving toggle members 66 up or down along cords 56, 58.

In operation, the camper 10 is usually towed to a camp site by a towing vehicle (not shown). When the camper 10 is in the folded state with the top 14 positioned adjacent the body 12, the flexible sidewalls 16 along with the window 28 and the curtain 31 are folded. After the top 14 has been raised relative to the body 12, the flexible sidewalls 16 enclose the interior space 24. FIG. 3 shows the curtain 31 in the lowered position and the flexible window 28 in the closed position. The operator can shift the curtain to the raised position shown in FIG. 4 by simply sliding the toggle members 66 upwardly, or by rolling the curtain upwardly and then sliding the toggle members up against the rolled curtain 31. As shown in FIG. 5, the window 28 can be lowered by unzipping the zipper 30 and rolling the window 28 into a roll as shown. The curtain 31 and the window 28 can be positioned independently of each other as the operator desires.

It will be appreciated that the foregoing is presented by way of illustration only, and not by way of any limitation and that various alternatives and modifications may be made to the described embodiment without departing from the spirit and scope of the invention.

What is claimed:

1. On a tent camper having a body portion and a top portion overlying the body portion, the top portion being raisable relative to the body portion, and a flexible outer wall interconnecting the top portion and the bottom portion to create an enclosed living space, a portion of the outer wall defining a screened opening, an interior wall panel comprising:

a flexible transparent window, said window being shiftable between a closed position in which the window lies generally adjacent the opening thus covering the opening and an open position in which the window exposes the opening;

a curtain disposed generally adjacent the window, said curtain being shiftable between a raised position and a lowered position; and retaining means for retaining said window generally adjacent the outer wall when said window is in said open position, said retaining means further including adjustment means for controlling the position of said curtain.

2. The sidewall as claimed in claim 1, wherein said window includes a top edge, a bottom edge, and a pair of interconnecting side edges, said top edge and said side edges being attached to the outer wall by a zipper.

3. The sidewall as claimed in claim 2, wherein said window rolls into a generally tubular shape when in said open position.

4. The sidewall as claimed in claim 1, wherein said retaining means includes a pair of retaining members, one of said retaining members being disposed generally adjacent one of said window side edges and the other of said retaining members being disposed generally adjacent the other of said window side edges.

5. The sidewall as claimed in claim 4, wherein each of said retaining members includes an inner cord and an outer cord.

6. The sidewall as claimed in claim 4, wherein said window is disposed between said retaining members and the outer wall.

7. The sidewall as claimed in claim 1, wherein said curtain includes a top edge attached to the camper top portion, a bottom edge, and a pair of interconnecting side edges, said curtain top edge including releasable fasteners to permit said curtain to be detached from the camper top portion.

8. The sidewall as claimed in claim 5, wherein said curtain is disposed between said inner cord and said outer of each of said retaining members.

9. The sidewall as claimed in claim 8, wherein said curtain includes a bottom edge and said adjustment means includes a toggle member carried by each of said retaining members, said toggle members slidably engaging said inner and said outer cord and abutting said curtain bottom edge, said toggle member permitting said curtain to be placed in said raised position, said lowered position, or in a plurality of intermediate positions between said raised position and said lowered position.

10. The sidewall as claimed in claim 7, including a bracket attached to the top portion, a portion of said bracket defining a slot, said releasable fasteners engaging said slot.

11. The sidewall as claimed in claim 10, wherein said fasteners are slidable along said slot to permit said curtain to slide horizontally in a direction parallel to the outer wall.

* * * * *